(12) United States Patent
Thoms et al.

(10) Patent No.: US 10,941,792 B2
(45) Date of Patent: Mar. 9, 2021

(54) DISPLACEMENT CONTROL DEVICE

(71) Applicant: Danfoss Power Solutions GmbH & Co OHG, Neumünster (DE)

(72) Inventors: Reinhardt Thoms, Holzbunge (DE); Martin Wüstefeld, Neumünster (DE); Sumeru Gourbidanur Srinivasamurthy, Neumünster (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 0 days.

(21) Appl. No.: 16/658,531

(22) Filed: Oct. 21, 2019

(65) Prior Publication Data

US 2020/0132092 A1 Apr. 30, 2020

(30) Foreign Application Priority Data

Oct. 25, 2018 (DE) .......................... 102018218301.5

(51) Int. Cl.
*F15B 15/20* (2006.01)
*F16K 11/07* (2006.01)

(52) U.S. Cl.
CPC ........ *F15B 15/204* (2013.01); *F16K 11/0712* (2013.01)

(58) Field of Classification Search
CPC .......... F15B 15/204; F15B 2211/20553; F15B 13/0407; F15B 13/0402; F16K 11/0712; F04B 49/002
See application file for complete search history.

(56) References Cited

U.S. PATENT DOCUMENTS 4,756,157 A * 7/1988 Appel ................... F16H 61/433
60/444
2008/0078456 A1 * 4/2008 Thoms .................. E02F 9/2285
137/488

(Continued)

FOREIGN PATENT DOCUMENTS

CA        827475 A      11/1969
DE       2725917 A1      9/1978

(Continued)

OTHER PUBLICATIONS

European Search Report for Serial No. EP 19204295.0 dated Mar. 11, 2020.

*Primary Examiner* — Thomas E Lazo
(74) *Attorney, Agent, or Firm* — McCormick, Paulding & Huber PLLC

(57) ABSTRACT

Displacement control device for providing pressure fluid to a servo unit for adjusting the displacement of a pressure fluid unit, having a control cylinder in which a control spool is mounted shiftable along the longitudinal axis of the control cylinder, an inlet port, a servo port and a discharge port are formed in the control cylinder longitudinally spaced from each other, wherein the control spool comprising: a basically cylindrical outer surface; a front face on which an actuation force can act for shifting the control spool along the longitudinal axis; a discharge area opposite to the front face; a longitudinal bore inside the control spool, wherein one end of the longitudinal bore opens towards the front face and the other end is connected via a backpressure orifice with the discharge area; a control recess provided lengthwise in the outer surface; a radial bore which connects via a flow limiting orifice the longitudinal bore with the outer surface, wherein the opening of the radial bore at the outer surface is located in circumferential direction beside the control recess, such that the opening of radial bore overlaps with the (Continued)

servo port in an actuated position of the control spool, in which the control recess connects the inlet port with the servo port.

22 Claims, 4 Drawing Sheets

(56) References Cited

U.S. PATENT DOCUMENTS

| | | | |
|---|---|---|---|
| 2015/0285214 A1* | 10/2015 | Thoms | F03C 1/005 91/422 |
| 2017/0089362 A1* | 3/2017 | Thoms | F04B 49/002 |
| 2017/0089367 A1 | 3/2017 | Thoms | |

FOREIGN PATENT DOCUMENTS

| | | | | |
|---|---|---|---|---|
| DE | 102008052338 B3 | | 4/2010 | |
| DE | 102011079691 B3 | * | 8/2012 | ............ F04B 49/002 |
| DE | 102011079691 B3 | | 8/2012 | |
| EP | 3284956 A1 | | 2/2018 | |

\* cited by examiner

DISPLACEMENT CONTROL DEVICE

CROSS-REFERENCE TO RELATED APPLICATION

This application claims foreign priority benefits under 35 U.S.C. § 119 to German Patent Application No. 102018218301.5 filed on Oct. 25, 2018, the content of which is hereby incorporated by reference in its entirety.

TECHNICAL FIELD

The present invention relates to a displacement control device of a pressure fluid unit for providing pressurized fluid to a servo unit for adjusting the displacement of a pressure fluid unit. The invention relates, for instance, to hydrostatic propel units, however it is not limited to such units. The invention refers in particular to an improved displacement control device providing for a better controlling and monitoring of the displacement of pressure fluid units. Further, in particular, the present invention relates to an improved control spool to be used in such displacement control devices.

BACKGROUND

For simplification reasons only the invention is explained by example of hydrostatic propel units, however can be applied to pneumatic units or the like, too.

Specifically with the control of hydrostatic propel units the control force for adjusting the displacement of such pressure fluid units have to be precise and should be independent from influences which are brought into the operating/pilot systems of such control units, for example vibrations or other unintentional motions or pressure peaks in feeding lines, which all create actuation forces on the control unit. These actuation forces are generated by means of manually operated valves, e.g., and transmitted over distances to the control unit by means of hoses. It is also common in the art to convert an operator input signal into an electronic signal which is used further for generating a hydraulic signal which moves a piston rod or something similar. Finally the actuation forces act mechanically on a control spool of a displacement control device in order to shift the control spool according to the operators input signal. In other cases the operators input signal is converted into an electrical signal guided to a solenoid acting by means of a pin on the control spool. Here, the forces which can be transmitted by such a concept on the control spool are relatively low. It is therefore preferred to convert these relative low magnetic forces into hydraulic or mechanical forces acting on the control spool. Furthermore, a pilot pressure provided as a direct or indirect actuation force of the control spool depends on pressure fluctuations in the hydraulic hoses or the pilot pressure creating device, e.g. a charge pump.

As it can be derived at least by a person skilled in the art, the operators input commands/signals and also the conversion of these commands/signal into an adequate actuation force on the control spool are influenced by the whole system environment, e.g., unintentional movements of a joystick, machine vibrations, elastic deformations of hoses or load changes and the like. All these influences are transmitted further directly or indirectly to the control device, in particular to the control spool causing an unstable displacement and operation of the pressure fluid unit. A person skilled in the art will detect lot of other possibilities which influence these actuation forces on the control spool. However the actuation forces should be as constant as possible for an optimal and reliable functionality of a pressure fluid unit.

SUMMARY

Hence, it is an object of the invention to lower the unsteady effects of such negative influences on the actuation forces acting on the control spool in order to provide a reliably controllable reaction of the pressure fluid unit. At the same time adjustability and responsiveness of the pressure fluid unit should be quick and should show a smooth handling capability. The control device should further be simple in construction and, simultaneously robust and cost effective. Furthermore, the invention should be applicable on already existing displacement control devices, too.

The object is reached by a displacement control device for pressure fluid units according to the invention in order to provide pressurized fluid to a servo unit for adjusting the displacement of the pressure fluid unit. The inventive displacement control device comprises a control cylinder in which a control spool is mounted shiftable along the longitudinal axis of the control cylinder. In the control cylinder an inlet port, a servo port and a discharge port are formed, e.g. as radial bores or circumferential grooves, which are, in longitudinal direction of the control cylinder, spaced from each other. The inventive control spool comprises a basically cylindrical outer surface, and a front face on which an actuation force can act for shifting the control spool along the longitudinal axis of the control cylinder. A discharge area is located opposite to the front face. A longitudinal bore inside the control spool opens at one side towards the front face, and connects the other end of the longitudinal bore via a backpressure orifice to the discharge area. In the outer surface of the control spool a basically rectangular or oval control recess, is realized lengthwise capable to connect either the inlet port or the discharge port with the servo port depending on the position of the control spool in the control cylinder. Further, a radial bore is introduced to the control spool circumferentially apart from the control recess and connects via a flow limiting orifice the outer surface with the longitudinal bore inside the control spool. Preferably the radial bore is located in the longitudinal direction of the control spool such that the radial bore seen in circumferential direction of the control spool lies beside the control recess and can be brought in an overlap position with the servo port, when the control spool is in such an actuated position within the control cylinder, in which the control recess connects the servo port with the inlet port.

In the initial position the control spool closes a fluid connection between the inlet port and the servo port. When the control spool is actuated/shifted, e.g. due to an operator command, one of both connections is enabled, as it is common state of the art for such kind of control devices. However, according to invention, when the control spool enables the connection between the servo port and the inlet port, the radial bore opens towards the servo port and fluid pressure can be guided via the radial bore, the flow limiting orifice and the longitudinal bore to the front face. The radial bore is closed by the inner cylindrical surface of control cylinder, when the control spool is either in its initial position or in the position in which the control spool enables the connection between the servo port and the discharge area.

By implementing such an internal passage into the control spool according to the invention, a backpressure charged by the pressure at the servo port can be guided to the front face of the control spool and can act there as a counter force to the actuation force, thereby damping the effects of unsteady vibration and disturbance forces acting on the control spool. Further, as valid for all proportional control valves, the amount of deflection of the control spool in the control cylinder depends on the size of the actuation force on the control spool, i.e. the deflection of the control spool is proportional to the actuation force and vice versa. Preferably, according to the invention the opening cross section of the radial bore, i.e. the degree of overlap between the radial bore and the circumferential servo port groove in the control cylinder also depends on the actuation force, such that the damping effect as well is proportional to the deflection of the control spool.

In one embodiment according to the invention an effective overlap of the radial bore and servo port is reached only when a certain deflection of the control spool is reached, i.e. at a certain amount of deflection of the control spool or a certain amount of the actuation force is needed, respectively, for creating the damping effect. However, in any kind of proportional control valves to which the inventive control spool is implemented to, the damping effect preferably raises with the size of deflection of the control spool in the associated control cylinder.

The inventive arrangement of the radial bore with its outer opening at the outer surface of the control spool circumferentially apart from the control recess provides for a load dependent damping effect as the opening of the radial bore on the cylindrical outer surface of the control spool can be open and closed by the cylindrical inner surface of the control cylinder—preferably proportional to the actuation force applied to the front face of the control spool. In other words the radial bore seen in the longitudinal direction of the control spool is positioned circumferentially apart, "in parallel" to the control recess such that the radial bore overlaps with the servo port only when the control spool is actuated by an actuation force on its front face.

Hence, if the control spool is shifted in such a way that a connection between the inlet port and the servo port is enabled by the control recess, pressurized fluid can enter the radial bore and a backpressure can be generated by means of the backpressure orifice, which acts on the front face against the actuation force. This backpressure rises with the gain of the control spool, i.e. with the distance of the control spool from its initial position. This backpressure can be used for dampen the control spool velocity in case of unsteady and/or unintentional actuation forces on the control spool. E.g., if there are pressure peaks or vibrating forces superimposing the actuation force, which are not intended and/or commanded by the operators input. Especially so called overshoots can be dampened by the backpressure counter-acting as counter force on the front face contrariwise to the actuation force.

From this it can be derived that the backpressure which is generated in the longitudinal bore raises with the raising servo pressure, i.e. with the deflection of the control spool, and provides therewith with an increasing damping effect. Hence, any vibrations caused in the environment of the inventive displacement control device can be dampened effectively and also in a "load sensitive" manner. This means that the higher the disturbance forces on the control spool the bigger the overlap of the opening of the radial bore with the servo port. Therefore, the higher the backpressure in the longitudinal bore and the higher the dampening force on the front face acting against the disturbance force.

The inventive displacement control device further provides for a good responsiveness to the operators commands as intentional displacements of the control spool, i.e. the intentional applied actuation forces are not restricted or dampened by the inventive internal passage/bypass in the control spool. However, the counter force generated by the backpressure continuously raises with the displacement of the control spool, thereby giving a proportional feedback to the operator about the amount of displacement achieved in the pressure fluid unit. As the backpressure orifice is connected also to a discharge area with a pressure level lower than charge pressure, the backpressure generated in the longitudinal bore remains constant when the control spool is maintained at a certain shifted position, respectively decreases to case or tank pressure level if the control spool is in its initial position or in a position in which the control recess enables a fluid connection between the servo port and the discharge port.

If the control spool is moved in a position in which the control recess connects the servo port with the discharge port, the outer opening of the radial bore in the control spool does not overlap with the servo port and hence, no backpressure is generated in the longitudinal bore. This provides for a quick release of servo pressure and therefore for a quick reaction time of the pressure fluid unit as the release of servo pressure is not hindered. Such that operator commands can be realized by the inventive displacement control device without obstacles on the low pressure servo/control side. Hence, with the inventive control spool and the inventive displacement control device an effective system for dampening irregular, unsteady forces at the actuation side is provided, which system does not negatively influence the response time of the pressure fluid unit itself.

In a preferred embodiment the radial bore is realized basically perpendicular to the longitudinal bore, however a person skilled in the art contemplates also a radial bore inclined with respect to the perpendicular direction of the longitudinal bore. The radial bore is connected to the longitudinal bore via a flow limiting orifice which shows preferably a bigger opening than the backpressure orifice connecting the longitudinal bore with the discharge area. By doing this the flow limiting orifice do not limit the backpressure which can be built-up in the longitudinal bore. However, if the flow limiting orifice is smaller in diameter than the backpressure orifice the flow limiting orifice can be used to limit the backpressure which can be generated in the longitudinal bore and therewith the counter force acting against the actuation force.

In another preferred embodiment the control spool shows two control recesses, e.g., placed circumferentially opposite to each other on the circumferential outer surface of the control spool. In this embodiment it is also preferred that two radial bores, each of which circumferentially spaced from the control recesses, are located on the outer surface of the control spool. A person skilled in the art will derive that an arrangement of three, four or even more control recesses in circumferentially spaced arrangement are covered by the invention. Needless to say that also unequal numbers of control recesses and radial bores are covered by the inventive idea. For the functioning of the inventive concept at least one control recess and at least one circumferentially spaced radial bore are sufficient.

The control recess itself shows an in general rectangular or oval form—when seen in a plan view—and is brought-in in the cylindrical outer surface of the control spool in a lengthwise direction such that pressurized fluid from the inlet port can flow to a servo port or, in another position of the control spool, pressurized fluid can flow from the servo port to the discharge port. By implementation of the inventive control spool in a (already existing or not) control cylinder the used pressurized fluid is not allowed to flow along the outer surface of the control spool, i.e. outside the control recess, since it is allowed to flow only via the control recess. In order that the control spool can be placed in different rotational positions, e.g. to be used also in already existing displacement control devices, the inlet port, the servo port and the discharge port are formed in one embodiment preferably as circumferential grooves inside the control cylinder. As the control recess or the control recesses only cover part of the circumferential surface of the inventive control spool any circumferential flow of pressurized fluid is eliminated by means of the in general cylindrical outer surface of the control spool, which preferably is sealed by the cylindrical inner surface of the control cylinder.

For improving the response characteristics of a pressure fluid unit, to which the inventive displacement control device is implemented to, the lateral edges of the control recess seen in longitudinal direction of the control spool are notched or chamfered in order to smoothen the beginning and/or end of a pressure change at the servo port. This further provides to a machine operator a better control of the pressure fluid unit when willingly increasing or decreasing the displacement of the pressure fluid unit.

A person skilled in the art easily detects that the inventive control spool and hence, also the inventive displacement control device can have a symmetrical structure as well, such that the explanations given above with regards to single sided spools, can be applied to double sided control spools as well in such a manner that they are symmetrical with regard to the discharge area. Hence, such an inventive symmetrical control spool shows on either side at least one control recess brought into the cylindrical outer surface and having two longitudinal bores each connecting the associated actuation front face with the discharge area via a corresponding backpressure orifice. Circumferentially spaced from the control recesses and at least one on each side of the symmetrical control spool, radial bores are arranged with openings on the outer surface of the control spool. Each opening connects circumferentially outside of the corresponding recess the cylindrical outer surface of the control spool via a flow limiting orifice with the corresponding internal longitudinal bore. Consequently also the control cylinder in such an embodiment is designed symmetrical with regard to the discharge port, i.e. having two servo ports arranged symmetrical to the discharge port and two inlet ports also arranged symmetrical with respect to the servo ports and the discharge port.

In this embodiment it can be derived that if an actuation force is acting on one of two front faces of the two sided control spool only one of the radial bores—depending on the direction of the force acting on the front face—will get in fluid connection with one of the two servo ports, i.e. the one which is charged with pressure fluid. If the actuation force is a pressure force acting on one of the two front faces the dampening pressure force generated by means of the inventive control spool will be generated on the opposite front face of the two-sided control spool on which the actuation force is acting. However, if the actuation force is a pulling force the counter-acting pressure force for dampening disturbance forces will act on the same front face as the actuation force.

Hence, with the implementation of a symmetrical control spool and a symmetrical control cylinder the inventive displacement control device is applicable also to pressure fluid units which can be displaced in two different directions, e.g. for changing the conveying direction of the used pressure fluid. By doing this the invention can be applied in hydraulic pumps as well as in hydraulic motoring mode, e.g., when a change of hydraulic fluid flow is intended.

As it can be seen at least by a person skilled in the art the two backpressure orifices as well as the two flow limiting orifices do not have to be of the same size in a symmetrical control spool. They can be different, e.g. for achieving different high damping effect for each conveying direction of a pressure fluid unit. Preferably both sides are formed completly symmetrical in order to reduce manufacturing and handling costs as well as to avoid assembly errors.

BRIEF DESCRIPTION OF THE DRAWINGS

A person skilled in the art will derive that the inventive displacement control device as well as the inventive control spool is applicable on other pressure fluid units and is not limited to hydrostatic units. A person skilled in the art will detect also that the inventive idea is not limited to axial or radial piston units since is also applicable to all kind of pressure fluid units as vane type units, gear type units and the like. In the following by the help of the attached Figures an inventive displacement control device with an inventive control spool is shown with the help of a hydrostatic unit, exemplarily for all kind of pressure fluid units. The invention is not limited to the embodiments shown below, however, even not descript, different embodiments can be combined or modified within the skills of a person with ordinary skills in the art and without leaving the scope of the inventive idea. The Figures show.

DETAILED DESCRIPTION

Figure 1:
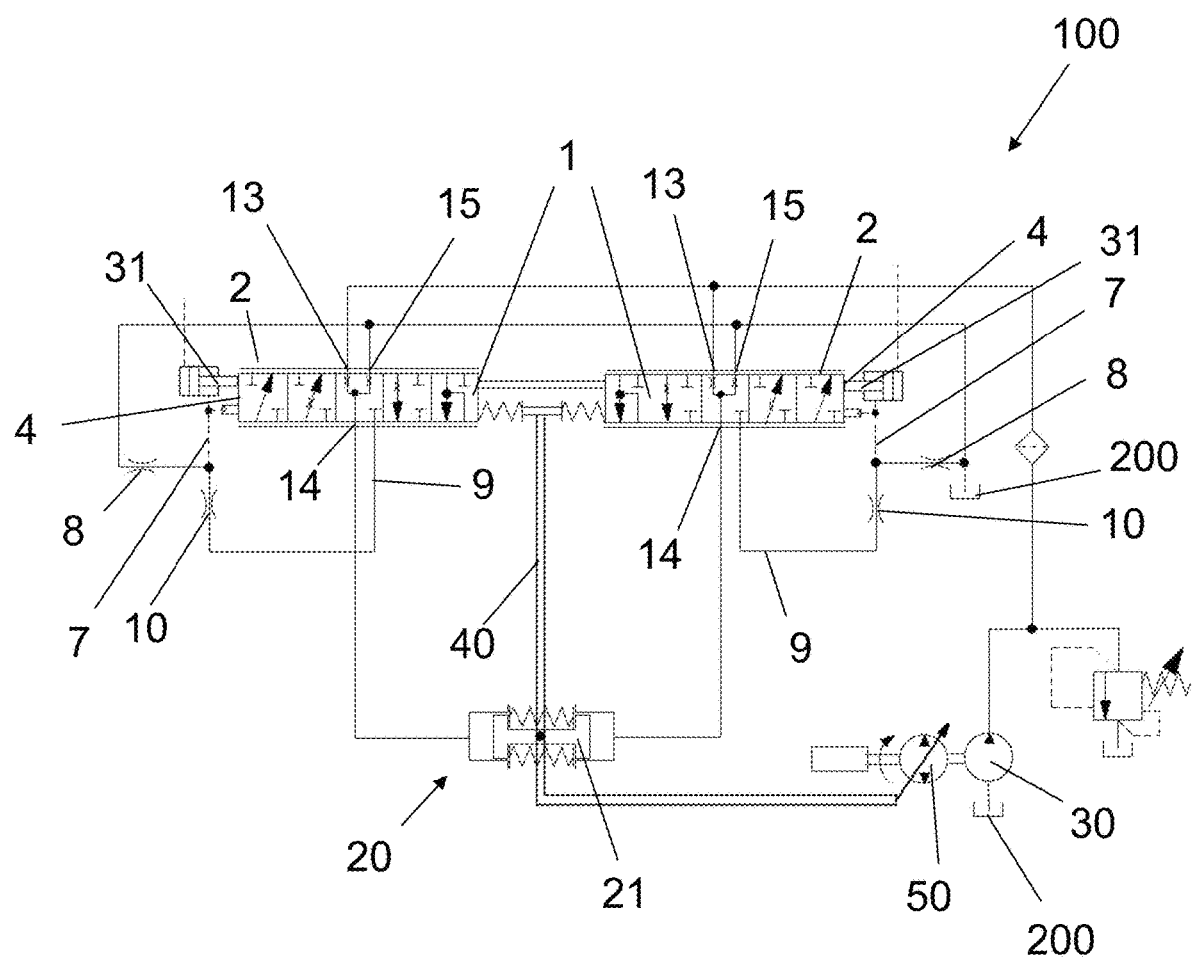
FIG. 1 a scheme for a hydrostatic pump operable in to conveying directions, comprising a two-sided symmetrical control spool.

FIG. 1 shows a schematic hydrostatic circuit diagram of a hydrostatic unit 50 having a two-sided displacement control device 100. The displacement control device 100 shows a symmetrical formed control cylinder 2 within which a symmetrical control spool 1 can be shifted in both directions along a longitudinal direction 3 of the control spool or the control cylinder, respectively. Via two inlet ports 13 charge pressure from a charge pump 30 can be supplied. Via two servo ports 14 a servo unit 20 for adjusting the displacement of hydraulic unit 50 can be provided on one side with pressurized fluid, wherein from the respective other servo side pressure fluid can be discharged—depending on the direction the control spool is shifted. If, e.g., the control spool 1 in is shifted towards the left in the plane of FIG. 1 the servo port 14 of the left side of control spool 1 is connected to the left inlet port 13. Simultaneously the servo port 14 on the right side of control spool 1 is connected to discharge port 15 for discharging servo pressure from the right side of servo unit 20 to a tank 200. By doing this a servo piston 21 in servo unit 20 is shifted, here in the plane of FIG. 1, towards the right. As a person skilled in the art knows, shifting the servo piston 21 changes the displacement of hydraulic unit 50 either to bigger or lower displacement depending on the embodiment of hydraulic unit 50.

In order to shift the control spool 1 as exemplarily assumed above to the left in the plane of FIG. 1, for instance, a mechanical pressure force acting towards the left can be brought-on the left front face 4 of the control spool 1. Mere exemplarily this can be done via a pilot pressure driving hydraulic pilot piston 31, as shown in FIG. 1. However, on each front face 4 of the symmetrical control spool 1 actuation forces can act in order to shift the control spool 1 in control cylinder 2 either to the left and/or to the right. This causes a change in the displacement of hydraulic unit 50. When control spool 1 is shifted to left, e.g. actuated on the right side of control spool 1, and in case the shifting is big enough, a passage at the left side of displacement control device 100 (radial bore 9; see FIGS. 2 to 6) opens towards an flow limiting orifice 10, connecting the passage 9 via another passage (longitudinal bore 7; see FIGS. 2 to 4) having a backpressure orifice 8, towards the front face 4 on the left side of control spool 1. Hence, servo pressure from the servo port 14 is guided via the flow limiting orifice 10 towards the left front face 4 of control spool 1 generating there a pressure force which counter-acts against the pilot pressure actuation force acting on the right front face 4. Therewith the counter pressure force which is limited by the opening size of the backpressure orifice 8 dampens the movement of control spool 1 in case the control spool 1 is intentionally or unintentionally moved further to the left in the plane of FIG. 1.

FIG. 1 is only one example for the working principle of the inventive displacement control device 100. Displacement control device 100 can be seen as a proportional valve, wherein the passage 9 opens gradually depending on the amount of movement of control spool 1. It can be seen also from FIG. 1 that within scope of the invention, the passage 9 need not to be opened at small displacements of control spool 1 since possibly opens only if control spool 1 receives a peak of vibration or a peak of an actuation force which should be dampened in order to avoid damages to the displacement control device or to the hydraulic unit and/or in order to dampen a too quick movement of the control spool or a too steep raise in pressure guided to the servo unit. This also provides for a smooth handling of the whole hydrostatic unit 50. Hence, a person skilled in the art derives from the schematic circuit diagram of FIG. 1 that vibration or force peaks actuating on the left and/or right side of control spool 1 can be dampened with a corresponding hydraulic force generated on the front face 4 of the respective other side of control spool 1. This provides for a better control and responsiveness in operating the displacement control device 100 and in consequence a more stable operation of hydraulic unit 50.

Figure 2:
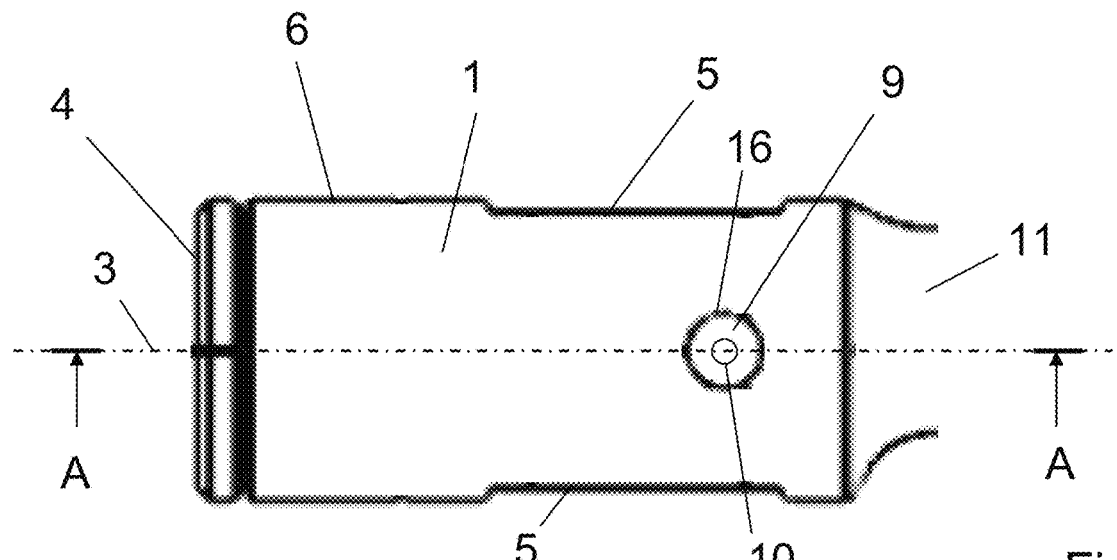
FIG. 2 a single-sided inventive control spool.

FIG. 2 shows a control spool 1 which, according to the invention, can be used as single side control spool 1 as well as a part of a symmetrical control 1 (see explanations above and FIG. 1). Control spool 1 shows an in general cylindrical outer surface 6 having on one side a front face 4 on which an actuating force can act. The control spool 1 shown in FIG. 2 depicts at the upper part as well as at the lower part control recesses 5 which are introduced longitudinally into the cylindrical surface 6. Circumferentially spaced, i.e. laterally beside of the control recesses 5 on the cylindrical spool outer surface 6 an opening 16 of an radial bore 9 introduced preferably perpendicular to the longitudinal direction 3, can be detected. This radial bore 9 is connected via an flow limiting orifice 10 to an longitudinal bore 7 (see FIGS. 3 to 6).

Figure 3:
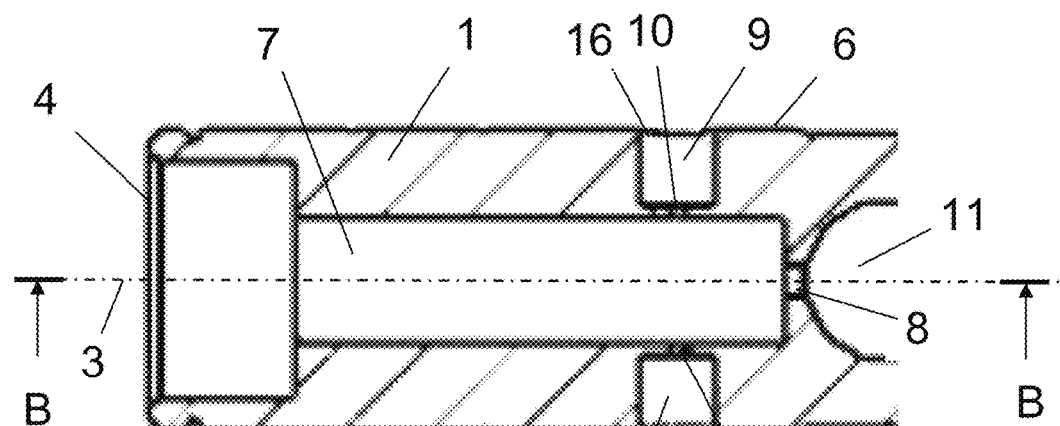
FIG. 3 a sectional view along the longitudinal direction A-A of the control spool of FIG. 2.

FIG. 3 which is a section cut along line A-A shown in FIG. 2 shows the control spool 1 in a sectional view. Here it can be seen that a longitudinal bore 7 is introduced into the control spool 1, wherein one end of the longitudinal bore 7 opens towards the front face 4 and the other end is connected via a backpressure orifice 8 with a discharge area 11 of the control spool 1. Hence, when the opening 16 of radial bore 9 on the outer surface 6 of the control spool 1 overlaps with a servo port—in case the control spool 1 is shifted correspondingly (see dotted lines in FIG. 6)—pressurized fluid can enter radial bore 9 via opening 16 and is restrictedly guided further by flow limiting orifices 10 to longitudinal bore 7, where the pressure fluid is able to generate a backpressure in the longitudinal bore 7, whose magnitude depends on the opening size of the backpressure orifice 8 connecting the longitudinal bore 7 with the discharge area 11. As the longitudinal bore 7 opens on the other end to front face 4, on front face 4 a counter-force to an actuation force is created when pressure fluid enters the radial bore 9.

Figure 4:
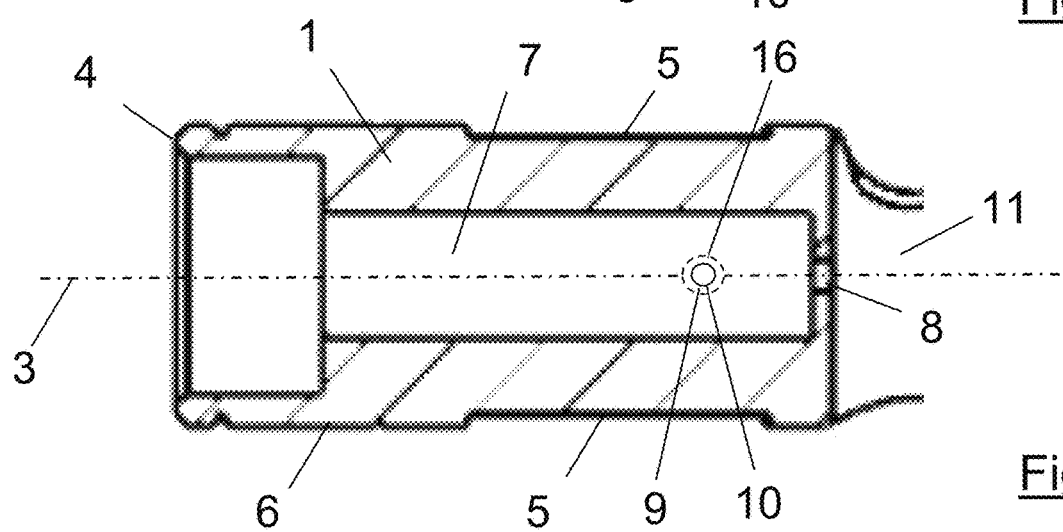
FIG. 4 a sectional view along the longitudinal direction B-B of the control spool shown in FIG. 3.

FIG. 4 shows a sectional cut of the control spool 1 shown in FIGS. 2 and 3 along the line B-B. In this sectional view the two control recesses 5 can be seen as well as the flow limiting orifice 10 located inside longitudinal bore 7. Here, in the embodiment shown in FIGS. 2 to 4, the radial bores 9 are arranged with its respective bore axis perpendicular to the longitudinal axis 3. As seen in circumferential direction of the cylindrical outer surface 6 the opening 16 of the radial bores 9 are rotated 90° with respect to the control recesses 5. For the principal functioning of control spool 1, however, only one control recess 5 and one radial orifice 9 connecting via a flow limiting orifice 10 the opening 16 at the cylindrical surface 6 with the longitudinal bore 7 would be sufficient as already explained above. Also the 90°-rotated arrangement of the radial bore 9 to a middle line of control recess 5 is mere exemplarily and can be of any other angle, as long as the radial bore 9 do not intersect with a control recess 5, i.e. as long as the opening 16 of the radial bore 9 do not lie inside control recess 5.

Figure 5:
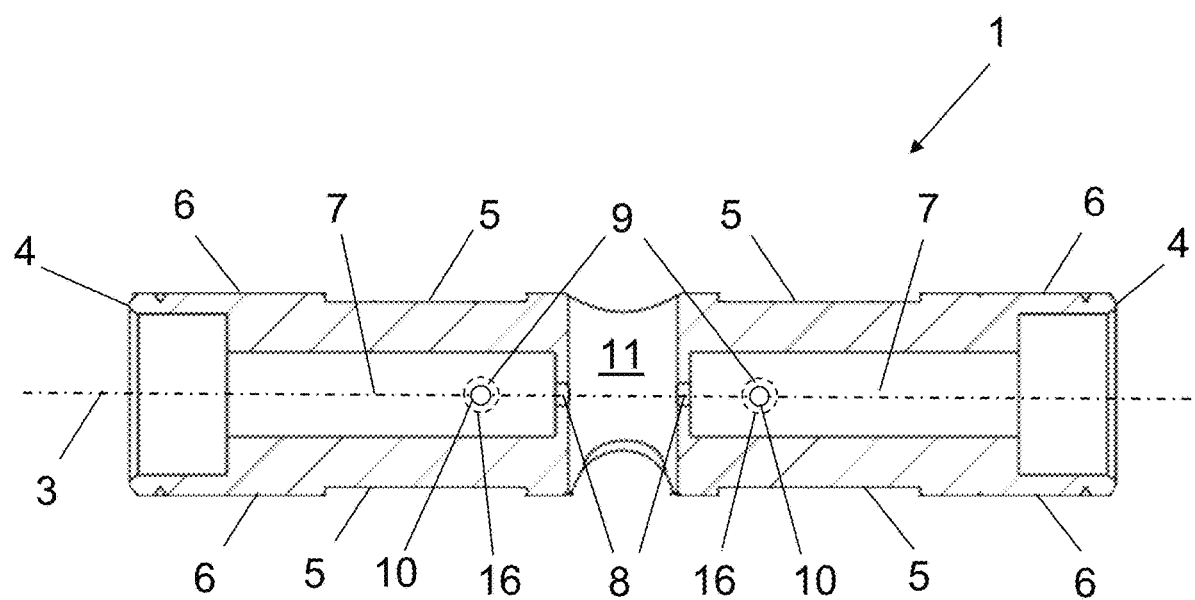
FIG. 5 a sectional view along the longitudinal direction of a two-sided symmetrical control spool shown in the plane of FIG. 4.

FIG. 5 shows the sectional cut representation of the control spool 1 of FIG. 4 as symmetrical control spool 1, which is symmetrical with regard to its discharge area 11. For simplification reason of this invention description the symmetrical parts are denominated with the same reference numbers, such that FIG. 5 is regarded to be self-explanatory.

Figure 6:
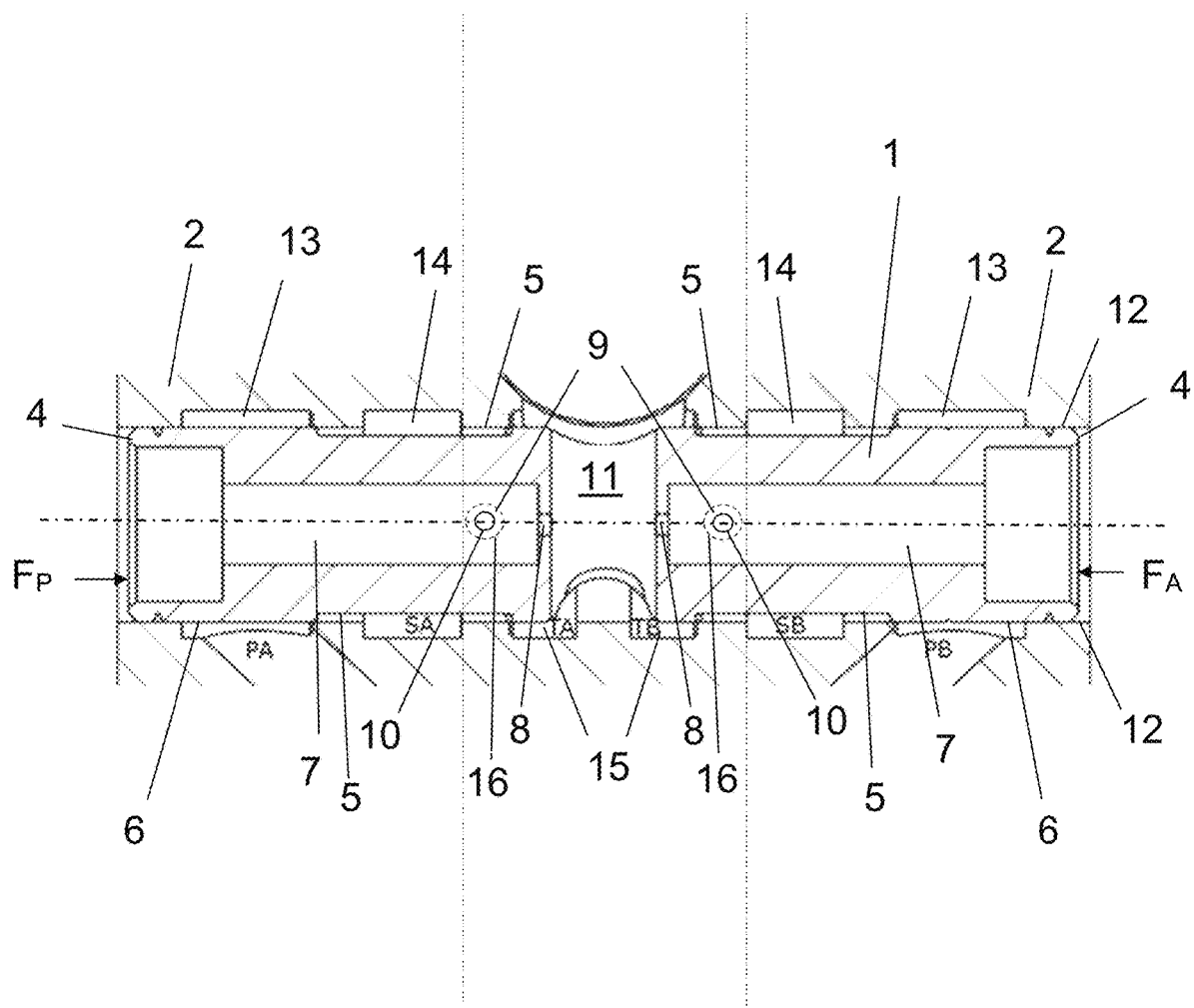
FIG. 6 a sectional view of a two-sided symmetrical displacement control unit comprising the control spool of FIG. 5.

FIG. 6 shows a longitudinal cut of a symmetrical structured displacement control device 100 with is a symmetrical control spool 1 according to FIG. 5. FIG. 6 shows as well a symmetrical control cylinder 2 with two inlet ports 13, two servo ports 14 and two discharge ports 15. The symmetrical control spool 1 shows at both ends front faces 4, on which actuation forces for shifting the control spool 1 in either direction can act. Within the corresponding longitudinal bores 7 flow limiting orifices 10 can be seen which are connected with corresponding radial bores 9 which further connects the cylindrical outer surface 6 of control spool 1 with the longitudinal bore 7. The symmetrical control spool 1 is shown in its initial position in which the control spool 1 closes both inlet ports 13.

If the symmetrical control spool 1 is shifted by an actuation force, for instance, on the right front face 4 by a pressure force to the left, left side servo port 14 is connected by the control recesses 5 of the shifted control spool with the left inlet port 13. On the other side, the right side of displacement control device 100 servo port 14 is connected with the right discharge port 15. At the same time on the left side of displacement control device 100 the opening 16 of radial bore 9 on the outer surface 6 of control spool 1 starts to overlap with the left servo port 14—see left dotted line—such that via the at least partial entering of servo pressure in radial bore 9 passing further to flow limiting orifice 10, a backpressure is generated in longitudinal bore 7. This backpressure is determined by the size of the left backpressure orifice 8 connecting the left longitudinal bore 7 with the left discharge area 11 of control spool 1 and hence, to left discharge port 15. Hence, at front face 4 on the left side of control spool 1 a backpressure force can be created actuating in a direction contrary to direction of the actuating force on the right side of symmetrical control spool 1, wherein the actuating force initially has shifted the control spool towards the left. From this it can be seen as well—at least by a person skilled in the art—that vibrations and overshoots in the shifting motion of control spool 1 can be dampened effectively by the hydraulic backpressure force generated on the respective other end of control spool 1. This is indicated in FIG. 6 by the arrows $F_A$ for the actuation force and $F_P$ for the backpressure force.

By means of the inventive displacement control device 100 an effective dampening of vibrations, oscillations and/or overshooting forces acting on the control spool can be achieved and therefore a rumble running of the pressure fluid units according to the state of the art can effectively be dampened in an easy and robust way as well as in a cost effective manner. A person with skills in the art will also detect that the inventive control spool 1 can easily be mounted in already existing control cylinders comprising inlet, servo and discharge port formed exemplarily as circumferentially grooves. By means of the inventive control spool already existing displacement control devices can be upgraded.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A displacement control device for providing pressure fluid to a servo unit for adjusting the displacement of a pressure fluid unit, having a control cylinder in which a control spool is mounted shiftable along the longitudinal axis of the control cylinder, an inlet port, a servo port and a discharge port are formed in the control cylinder longitudinally spaced from each other, wherein the control spool comprising:
    a basically cylindrical outer surface;
    a front face on which an actuation force can act for shifting the control spool along the longitudinal axis;
    a discharge area opposite to the front face;
    a longitudinal bore inside the control spool, wherein one end of the longitudinal bore opens towards the front face and the other end is connected via a backpressure orifice with the discharge area;
    a control recess provided lengthwise in the outer surface;
    a radial bore which connects via a flow limiting orifice the longitudinal bore with the outer surface, wherein the opening of the radial bore at the outer surface is located in circumferential direction beside the control recess, such that the opening of radial bore overlaps with the servo port in an actuated position of the control spool, in which the control recess connects the inlet port with the servo port.

2. The displacement control device according to claim 1, wherein the control recess in another actuated position connects the inlet port with servo port and the opening of radial bore do not overlap with the servo port.

3. The displacement control device according to claim 2, wherein the radial bore is perpendicular to the longitudinal bore.

4. The displacement control device according to claim 2, wherein the flow limiting orifice is bigger in diameter than the backpressure orifice.

5. The displacement control device according to claim 2, wherein two control recesses and two openings of radial bores, each of the radial bores connecting the longitudinal bore with a flow limiting orifice, are formed on the outer surface.

6. The displacement control device according to claim 1, wherein the radial bore is perpendicular to the longitudinal bore.

7. The displacement control device according to claim 6, wherein the flow limiting orifice is bigger in diameter than the backpressure orifice.

8. The displacement control device according to claim 6, wherein two control recesses and two openings of radial bores, each of the radial bores connecting the longitudinal bore with a flow limiting orifice, are formed on the outer surface.

9. The displacement control device according to claim 1, wherein the flow limiting orifice is bigger in diameter than the backpressure orifice.

10. The displacement control device according to claim 1, wherein two control recesses and two openings of radial bores, each of the radial bores connecting the longitudinal bore with a flow limiting orifice, are formed on the outer surface.

11. The displacement control device according to claim 10, wherein the two control recesses are placed circumferentially opposite to each other and the two openings of radial bores are placed circumferentially opposite to each other.

12. The displacement control device according to claim 1, wherein at least one lateral end in longitudinal direction of the control recess is notched or chamfered.

13. The displacement control device comprising a two-sided control spool analogous to a control spool of claim 1, which is symmetrical with respect to the discharge area, is received in a symmetrical control cylinder which comprising two inlet ports and two servo ports both type of ports symmetrically arranged with respect to at least one discharge port.

14. The displacement control device according to claim 13, wherein the symmetrical control spool closes in its initial position both inlet ports.

15. A hydraulic unit comprising a displacement control device according to claim 1, wherein the actuation force on the control spool is transmitted mechanically onto front face.

16. A control spool for pressure fluid displacement control device in which the control spool can be mounted shiftable along a longitudinal axis of a control cylinder; the control spool comprising:
    a basically cylindrical outer surface;
    a front face, on which an actuation force can act for shifting the control spool in the longitudinal direction;
    a discharge area opposite to the front face;
    a longitudinal bore inside the control spool, wherein one end of the longitudinal bore opens towards the front face and the other end is connected via a backpressure orifice with the discharge area;

a control recess provided lengthwise in the outer surface;

a radial bore whose opening at the outer surface is located in circumferential direction beside the control recess, wherein the radial bore connects the longitudinal bore with the outer surface via a flow limiting orifice.

17. The control spool according to claim 16, wherein the radial bore is perpendicular to the longitudinal bore.

18. The control spool according to claim 16, wherein the backpressure orifice is smaller in diameter than the flow limiting orifice.

19. The control spool according to claim 16, wherein two control recesses and two openings of radial bores, each of the radial bore connecting the longitudinal bore with a flow limiting orifice, are formed on the outer surface.

20. The control spool according to claim 16, wherein at least one lateral end in the longitudinal direction of the control recess is notched or chamfered.

21. A symmetrical control spool analogous to a control spool of claim 16, which can be actuated on two opposite front surfaces, wherein the symmetrical control spool is designed such that the control spool features of control spool according to claim 16 are arranged symmetrical with respect to the discharge area.

22. A displacement control device for providing pressure fluid to a servo unit for adjusting the displacement of a pressure fluid unit, having a control cylinder in which a control spool is mounted shiftable along the longitudinal axis of the control cylinder, an inlet port, a servo port and a discharge port are formed in the control cylinder longitudinally spaced from each other, wherein the control spool comprising:

a basically cylindrical outer surface;

a front face on which an actuation force can act for shifting the control spool along the longitudinal axis;

a discharge area opposite to the front face;

a longitudinal bore inside the control spool, wherein one end of the longitudinal bore opens towards the front face and the other end is connected via a backpressure orifice with the discharge area;

a control recess provided lengthwise in the outer surface;

a radial bore which connects via a flow limiting orifice the longitudinal bore with the outer surface, wherein the opening of the radial bore at the outer surface overlaps with the servo port in an actuated position of the control spool, in which the control recess connects the inlet port with the servo port;

wherein the flow limiting orifice is bigger in diameter than the backpressure orifice; and/or wherein at least one lateral end in longitudinal direction of the control recess is notched or chamfered.

* * * * *